US009380206B2

(12) United States Patent
Miyamoto et al.

(10) Patent No.: US 9,380,206 B2
(45) Date of Patent: Jun. 28, 2016

(54) IMAGE PROCESSING APPARATUS THAT COMBINES IMAGES

(71) Applicant: CASIO COMPUTER CO., LTD., Shibuya-ku, Tokyo (JP)

(72) Inventors: Naotomo Miyamoto, Tokyo (JP); Kosuke Matsumoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 510 days.

(21) Appl. No.: 13/791,699

(22) Filed: Mar. 8, 2013

(65) Prior Publication Data

US 2013/0250044 A1    Sep. 26, 2013

(30) Foreign Application Priority Data

Mar. 12, 2012   (JP) ................................. 2012-054002

(51) Int. Cl.
*H04N 5/00* (2011.01)
*H04N 5/232* (2006.01)
*H04N 5/341* (2011.01)

(52) U.S. Cl.
CPC .......... *H04N 5/23238* (2013.01); *H04N 5/3415* (2013.01)

(58) Field of Classification Search
CPC ......................... H04N 5/23238; H04N 5/3415
USPC ......................................................... 348/38
See application file for complete search history.

(56) References Cited

U.S. PATENT DOCUMENTS

| 8,300,110 B2 | 10/2012 | Hatanaka et al. |
| 2011/0096143 A1 | 4/2011 | Ono |
| 2011/0193941 A1* | 8/2011 | Inaba et al. ................ 348/46 |
| 2012/0182400 A1 | 7/2012 | Yamashita et al. |

FOREIGN PATENT DOCUMENTS

| JP | 11-282100 A | 10/1999 |
| JP | 2004046573 A | 2/2004 |
| JP | 2008176430 A | 7/2008 |
| JP | 2010166558 A | 7/2010 |
| JP | 2011082918 A | 4/2011 |
| JP | 2011097246 A | 5/2011 |

OTHER PUBLICATIONS

Japanese Office Action (and English translation thereof) dated Apr. 7, 2015, issued in counterpart Japanese Application No. 2012-054002.
Japanese Office Action (and English translation thereof) dated Jun. 23, 2015, issued in counterpart Japanese Application No. 2012-054002.

* cited by examiner

*Primary Examiner* — Jeffery Williams
(74) *Attorney, Agent, or Firm* — Holtz, Holtz & Volek PC (57) ABSTRACT

An image processing apparatus 1 includes: an adjustment unit 55 that adjusts adjacent captured images in panoramic image generation processing; and a panoramic image generation unit 56 that generates data of a panoramic image by combining the adjacent captured images based on a result of this adjustment. The adjustment unit 55 includes: a characteristic point trace unit 552 that calculates vectors of a plurality of corresponding characteristic points in the adjacent captured images; and a position adjustment unit 554 that adjusts the adjacent captured images based on the vectors of the corresponding characteristic points thus calculated, by avoiding a moving object whose image is currently captured.

9 Claims, 5 Drawing Sheets

PANORAMIC IMAGE CAPTURING DIRECTION

FIG. 5

IMAGE PROCESSING APPARATUS THAT COMBINES IMAGES

This application is based on and claims the benefit of priority from Japanese Patent Application No. 2012-054002, filed on 12 Mar. 2012, the content of which is incorporated herein by reference.

BACKGROUND OF THE INVENTION

1. Field of the Invention

The present invention relates to an image processing apparatus, an image processing method, and a recording medium, in which images are combined.

2. Related Art

In digital cameras, portable telephones with an image capturing function, and the like, the limit of the image capturing range depends on the hardware specifications provided by the device main body, such as the focal distance of the lens and size of the imaging elements. Accordingly, techniques are conventionally known, such as a panoramic image capturing technique for obtaining a wide-angle image that surpasses hardware specifications.

In order to realize the panoramic image capturing, for example, a user moves the digital camera to rotate in the horizontal direction about the user's body, while maintaining the digital camera substantially fixed in the vertical direction, while keeping the shutter switch depressed. The digital camera then executes image capture processing a plurality of times during this period, and transversely (horizontally) combines data of a plurality of images (hereinafter referred to as "captured images") obtained as a result of the plurality of times of the image capture processing, thereby generating data of a panoramic image.

As an artifice for the panoramic image capturing, for example, Japanese Unexamined Patent Application, Publication No. H11-282100 discloses a method of generating data of a panoramic image by detecting a characteristic point in a captured image in each of a plurality of times of the image capture processing, and synthesizing the data of two adjacent captured images such that the characteristic points in the two adjacent captured images coincide with each other.

SUMMARY OF THE INVENTION

An image processing apparatus according to one aspect of the present invention is characterized by including: an acquisition unit that acquires a first image and a second image consecutively captured by an image capturing unit, while the image capturing unit is moved; a division unit that divides the first image acquired by the acquisition unit into a plurality of areas; a characteristic point detection unit that detects first characteristic points in the areas respectively and second characteristic points in the second image, the second characteristic points corresponding to the first characteristic points respectively; a vector calculation unit that calculates vectors between the first characteristic points and the corresponding second characteristic points; an area selection unit that selects a particular area from the areas, based on the vectors calculated by the vector calculation unit; and a combining unit that combines the images, based on a vector included in the particular area selected by the area selection unit.

An image processing method according to one aspect of the present invention is characterized by including: an acquiring step of acquiring a first image and a second image consecutively captured by an image capturing unit, while the image capturing unit is moved; a dividing step of dividing the first image acquired in the acquisition step into a plurality of areas; a characteristic point detecting step of detecting first characteristic points in the areas respectively and second characteristic points in the second image, the second characteristic points corresponding to the first characteristic points respectively; a vector calculating step of calculating vectors between the first characteristic points and the corresponding second characteristic points; an area selecting step of selecting a particular area from the areas, based on the vectors calculated in the vector calculating step; and a combining step of combining the images, based on a vector included in the particular area selected in the area selecting step.

A recording medium according to one aspect of the present invention is a storage medium having stored therein a computer readable program, the program causing a computer to function as: an acquisition unit that acquires a first image and a second image consecutively captured by an image capturing unit, while the image capturing unit is moved; a division unit that divides the first image acquired by the acquisition unit into a plurality of areas; a characteristic point detection unit that detects first characteristic points in the areas respectively and second characteristic points in the second image; the second characteristic points corresponding to the first characteristic points respectively; a vector calculation unit that calculates vectors between the first characteristic points and the corresponding second characteristic points; an area selection unit that selects a particular area from the areas, based on the vectors calculated by the vector calculation unit; and a combining unit that combines the images, based on a vector included in the particular area selected by the area selection unit.

DETAILED DESCRIPTION OF THE INVENTION

An embodiment of the present invention is hereinafter described with reference to the drawings.

Figure 1:
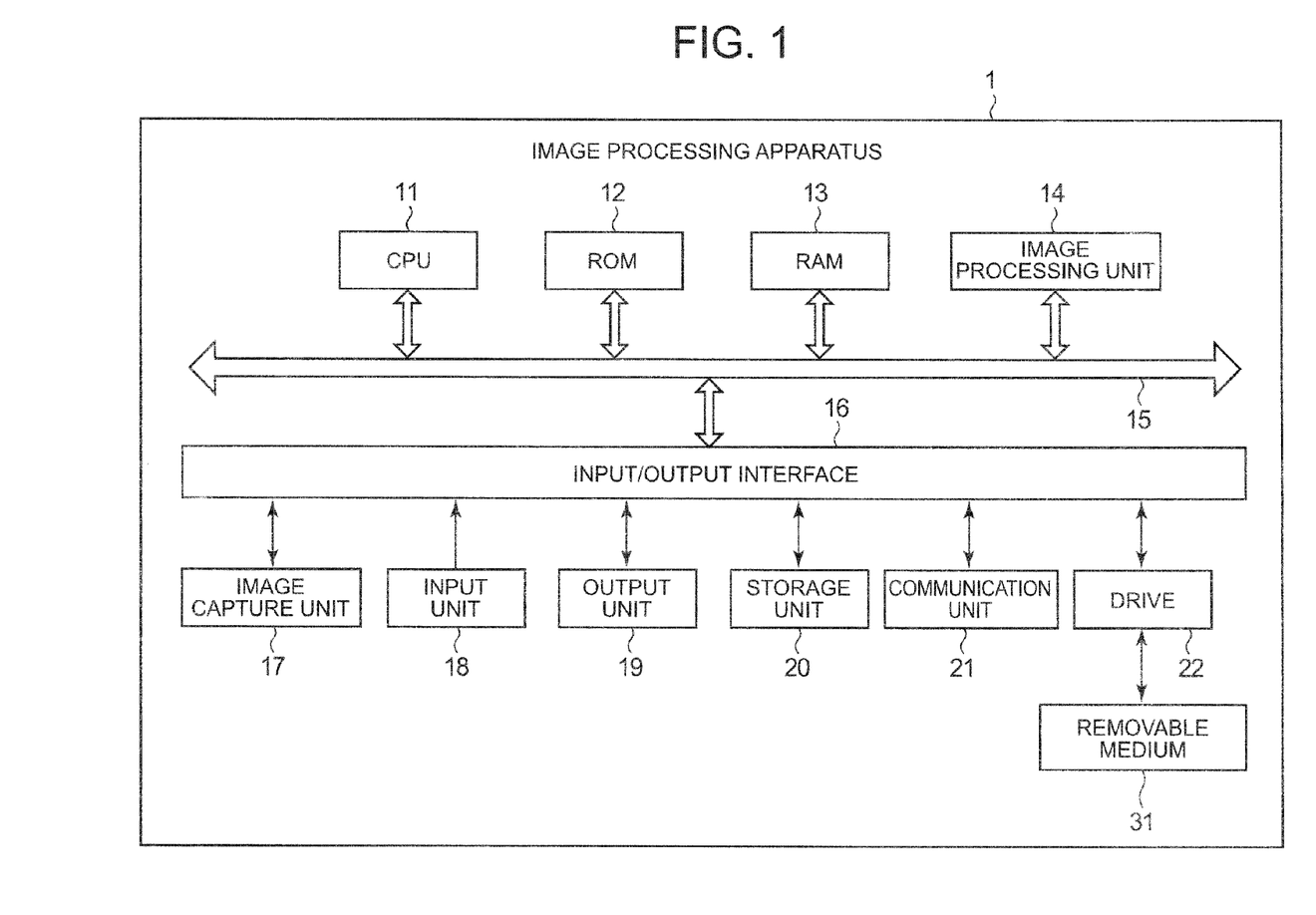
FIG. 1 is a block diagram showing a hardware configuration of an image processing apparatus according to an embodiment of the present invention.

FIG. 1 is a block diagram showing a hardware configuration of an image processing apparatus 1 according to an embodiment of the present invention. The image processing apparatus 1 is configured as, for example, a digital camera.

The image processing apparatus 1 includes a CPU (Central Processing Unit) 11, ROM (Read Only Memory) 12, RAM (Random Access Memory) 13, an image processing unit 14, a bus 15, an input/output interface 16, an image capturing unit 17, an input unit 18, an output unit 19, a storage unit 20, a communication unit 21, and a drive 22.

The CPU 11 executes a variety of processing in accordance with programs that are recorded in the ROM 12, or programs that are loaded from the storage unit 20 to the RAM 13.

The RAM 13 also stores data and the like necessary for the CPU 11 to execute the variety of processing, as appropriate.

The image processing unit 14 is configured by a DSP (Digital Signal Processor), VRAM (Video Random Access Memory), etc., and collaborates with the CPU 11 to execute the variety of image processing on data of an image.

The CPU 11, the ROM 12 and the RAM 13 are mutually connected via the bus 15. The input/output interface 16 is also connected to the bus 15. The image capturing unit 17, the input unit 18, the output unit 19, the storage unit 20, the communication unit 21 and the drive 22 are connected to the input/output interface 16.

The image capturing unit 17 includes an optical lens unit and an image sensor (not shown).

In order to capture an image of a subject, the optical lens unit is configured by a lens such as a focus lens and a zoom lens for condensing light. The focus lens forms an image of a subject on a light receiving surface of the image sensor. The zoom lens freely changes its focal length within a certain range. The optical lens unit includes peripheral circuits, as necessary, for adjusting configuration parameters such as focal point, exposure, white balance, etc.

The image sensor is configured by photoelectric conversion elements, AFE (Analog Front End), etc. The photoelectric conversion elements are configured by CMOS (Complementary Metal Oxide Semiconductor)-type photoelectric conversion elements, etc. A subject image enters the photoelectric conversion elements through the optical lens unit. By way of the photoelectric conversion elements, the subject image undergoes photoelectric conversion (i.e. is captured), image signals are accumulated for a certain period of time, and the accumulated image signals are sequentially supplied as analog signals to the AFE.

The AFE executes a variety of signal processing such as A/D (Analog/Digital) conversion processing on the analog image signals. The variety of signal processing generates digital signals to be output as output signals of the image capturing unit 17.

Such an output signal of the image capturing unit 17 is hereinafter referred to as "data of a captured image". The data of the captured image is supplied to the CPU 11, the image processing unit 14, etc. as appropriate.

The input unit 18 is configured by various buttons such as a shutter switch, and inputs a variety of information in accordance with instruction operations by a user.

The output unit 19 is configured by a display, a speaker, etc., and outputs images and sound.

The storage unit 20 is configured by a hard disk, DRAM (Dynamic Random Access Memory) or the like, and stores data of various images.

The communication unit 21 controls communication with other devices (not shown) via a network including the Internet.

A removable medium 31, which is composed of a magnetic disk, an optical disk, a magneto-optical disk, semiconductor memory or the like, is mounted to the drive 22, as appropriate. Programs that are read via the drive 22 from the removable medium 31 are installed in the storage unit 20, as necessary. Similarly to the storage unit 20, the removable medium 31 can also store a variety of data such as image data stored in the storage unit 20.

Figure 2:
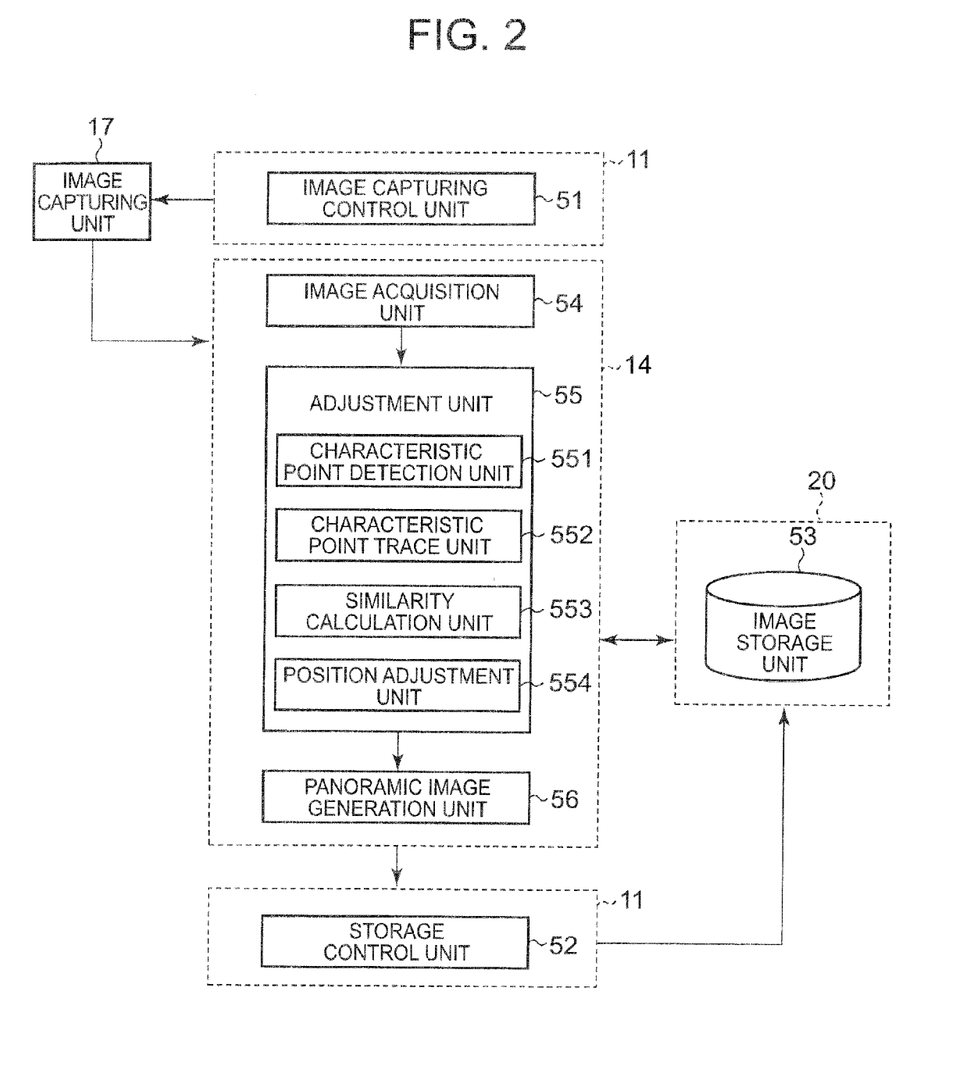
FIG. 2 is a functional block diagram showing a functional configuration for executing panoramic image generation processing, in the functional configuration of the image processing apparatus shown in FIG. 1.

FIG. 2 is a functional block diagram showing a functional configuration for executing panoramic image generation processing, in the functional configuration of the image processing apparatus 1 as described above. Here, the "panoramic image generation processing" refers to processing for generating data of a panoramic image by using data of a plurality of captured images that are consecutively acquired. The "panoramic image" is an example of a wide-angle image that is elongated laterally or vertically as compared to an image with an aspect ratio of 2:3 captured by using a 35-millimeter silver film, or an image with an aspect ratio of 3:4 captured by using a digital camera.

In a case in which the image processing apparatus 1 executes the panoramic image generation processing, the CPU 11 functions as an image capturing control unit 51 and a storage control unit 52. In this case, the storage unit 20 includes an image storage unit 53 as an area for storing data of various images such as data of a captured image and data of a panoramic image.

The image capturing control unit 51 controls various image capturing operations of the image capturing unit 17.

More specifically, when the user depresses a shutter switch of the input unit 18 while holding the image processing apparatus 1 as a digital camera, the image processing apparatus 1 starts the panoramic image generation processing. When the panoramic image generation processing is started, the image capturing control unit 51 causes the image capturing unit 17 to start consecutive image capturing operations, and to capture an image each time a certain period of time elapses, or each time the image processing apparatus 1 moves a predetermined amount.

During this period, in a case in which a predetermined condition is satisfied, such as a case in which the user keeps depressing the shutter switch for a predetermined period of time, or a case in which the digital camera moves a predetermined amount, the image capturing control unit 51 terminates the consecutive image capturing operations of the image capturing unit 17, and terminates the panoramic image generation processing.

The storage control unit 52 controls the image storage unit 53 to store data of various images, such as data of the panoramic image that is generated as a result of the panoramic image generation processing.

In a case in which the image processing apparatus 1 executes the panoramic image generation processing, the image processing unit 14 functions as an image acquisition unit 54, an adjustment unit 55, and a panoramic image generation unit 56.

The image acquisition unit 54 sequentially acquires data of a plurality of captured images that are output as a result of the consecutive image capturing operations of the image capturing unit 17, i.e. data of a plurality of consecutively captured images.

As the processing on each data of the plurality of captured images that are acquired by the image acquisition unit 54, the adjustment unit 55 adjusts adjacent captured images among the plurality of captured images. Among the plurality of consecutively captured images, the adjacent captured images refer to the $n^{th}$ and $n+1^{th}$ captured images (n is an integer value that is 1 or larger).

For the purpose of preventing generation of data of an panoramic image that gives an unnatural impression due to movement of an object such as a person that moves irrespective of the digital camera, the adjustment unit 55 of the present embodiment is configured to include a characteristic point detection unit 551, a characteristic point trace unit 552, a similarity calculation unit 553, and a position adjustment unit 554. Here, the characteristic point detection unit 551 functions as characteristic point detecting means, the characteristic point trace unit 442 functions as vector calculating means, and the similarity calculation unit 553 and the position adjustment unit 554 function as area selecting means.

As the processing on each data of the plurality of captured images that are acquired by the image acquisition unit 54, the characteristic point detection unit 551 detects a plurality of characteristic points in the captured image. In other words, each time the image acquisition unit 54 acquires data of a captured image, the characteristic point detection unit 551 detects a plurality of characteristic points in the captured image thus acquired. The characteristic point detection unit 551 associates the detected characteristic points with the data of the captured image that is acquired by the image acquisition unit 54, and stores them into the image storage unit 53.

At this time, the characteristic point detection unit 551 divides the captured image into a plurality of continuous areas, and detects a characteristic point in each of the plurality of areas. The areas obtained by dividing the captured image can have an arbitrary shape, and for example, it is possible to employ rectangular areas. As will be described later, the plurality of areas are arranged continuously in a direction of movement of the digital camera (hereinafter referred to as "panoramic image capturing direction") and in a direction substantially orthogonal to the direction of movement. The substantially orthogonal direction is used because the panoramic image capturing direction may not be linear in some cases due to camera shake or the like, and, in a simple description, the substantially orthogonal direction is a direction perpendicular to the panoramic image capturing direction being the horizontal direction.

Here, a conventionally well-known method can be employed as a method of detecting a characteristic point in each of the plurality of the areas. For example, SIFT (Scale Invariant Feature Transform) may be used, Harris's corner detection method may be used, and any other method may be used.

As the processing on the plurality of characteristic points in each of the adjacent captured images, the characteristic point trace unit 552 calculates a so-called motion vector between the corresponding characteristic points, i.e. a vector that indicates how the characteristic point has moved between the adjacent captured images. In other words, when the characteristic point detection unit 551 detects a plurality of characteristic points in the n+1$^{th}$ captured image, the characteristic point trace unit 552 identifies, from the characteristic points in the n+1$^{th}$ captured image thus detected, a point corresponding to a characteristic point in the n$^{th}$ captured image stored in the image storage unit 53, and calculates a vector from the characteristic point in the n$^{th}$ captured image to the corresponding point in the n+1$^{th}$ captured image, as a vector between the corresponding characteristic points. At this time, the characteristic point trace unit 552 associates the calculated vector with the data of the n$^{th}$ captured image, and stores them into the image storage unit 53. In the present embodiment, a vector indicates a direction and magnitude (distance), through which a characteristic point has moved.

The characteristic point trace unit 552A can identify a corresponding point by using, for example, a matching technique that focuses on pixels including each characteristic point among the plurality of detected characteristic points.

As the processing on the vector calculated by the characteristic point trace unit 552, the similarity calculation unit 553 calculates similarity of vectors in each area of the image. Since a moving object moves irrespective of the movement of the digital camera, the similarity calculation unit 553 calculates similarity of the vectors, thereby identifying the position of the moving object in an n$^{th}$ captured image. The adjacent captured images are adjusted by avoiding the position of the moving object that is identified in this manner, thereby making it possible to prevent generation of data of a panoramic image that gives an unnatural impression.

Here, in the panoramic image generation processing, the data of the adjacent captured images is typically adjusted linearly along a direction substantially orthogonal to the panoramic image capturing direction. Accordingly, among the plurality of areas, the similarity calculation unit 553 calculates similarity of vectors in each of a group of areas arranged adjacently along the direction substantially orthogonal to the panoramic image capturing direction. Since edges (top edge, bottom edge, leftmost edge, and rightmost edge) of a captured image may be corrected for distortion of a lens and the like of a digital camera, it is preferable for the similarity calculation unit 553 to calculate similarity of vectors in only areas near the center other than the edges of the captured image. At this time, the size of the areas near the center can be arbitrarily set, and for example, may be set based on the lens performance, or may be set based on a movement distance between adjacent captured images, such as moving speed of the digital camera and image capturing timing (the size of the areas near the center is larger as the movement is larger, and the size of the areas near the center is smaller as the movement is smaller). The areas near the center may be used when similarity of vectors is calculated, and may be used when a captured image is divided into areas for detecting characteristic points.

Similarity of vectors means similarity of direction and magnitude through which the characteristic point has moved, and the similarity is calculated by an SAD (Sum of Absolute Difference) calculation in the present embodiment. In other words, the similarity calculation unit 553 calculates similarity of vectors by calculating and adding differences of vectors adjacent to one another in a group of areas. In such SAD calculation, the vectors in a group of areas are more similar as the calculation result is smaller, and the vectors in a group of areas are less similar as the calculation result is larger. At this time, in a case in which the plurality of characteristic points in a group of areas include a characteristic point whose corresponding point cannot be identified, it is preferable for the similarity calculation unit 553 to determine that the vectors in a group of areas are not similar. This is because a corresponding point is unlikely to be identified as a result of a moving object having moved (for example, as a result of a moving object having moved to a front side of a characteristic point in the n+1$^{th}$ captured image). The calculation of similarity is not limited to SAD calculation, and similarity may be calculated by an arbitrary method, or may be calculated by a well-known method such as SSD (Sum of Squared intensity Difference) or standard deviation, for example.

The position adjustment unit 554 adjusts adjacent captured images, based on the vectors between the characteristic points calculated by the characteristic point trace unit 552. In other words, the position adjustment unit 554 adjusts adjacent captured images, by avoiding the position of a characteristic point indicating a vector that is abnormal in comparison with vectors of the other characteristic points.

More specifically, the position adjustment unit 554 adjusts adjacent captured images, based on similarity of vectors in a group of areas, which is calculated by the similarity calculation unit 553. Here, the position adjustment unit 554 may adjust images at a position of a group of areas in which vectors are similar by at least a predetermined value, or may adjust images at a position of a group of areas in which vectors are the most similar. As a result, the adjacent captured images can be adjusted at a position by avoiding a moving object that moves irrespective of the movement of the digital camera.

The panoramic image generation unit 56 combines the data of the captured images adjusted by the adjustment unit 55, and generates data of a panoramic image. The panoramic image generation unit 56 stores the data of the panoramic image thus generated into the image storage unit 53.

Figure 3A:
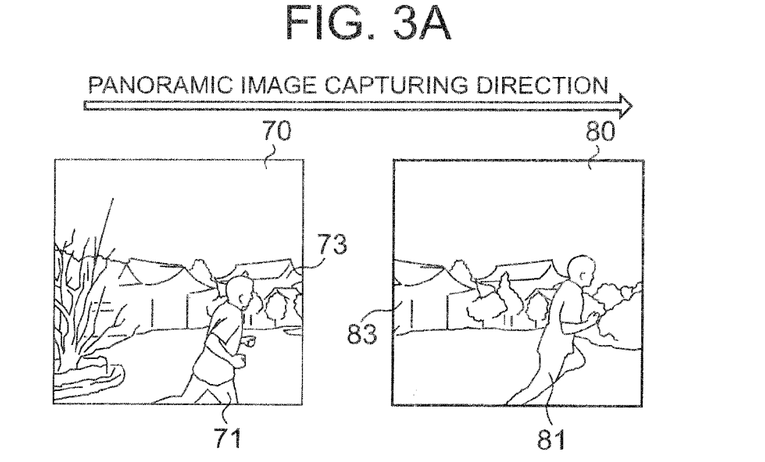
FIGS. 3A, 3B and 3C are diagram for illustrating a function of an adjustment unit of the image processing unit.
Figure 3B:
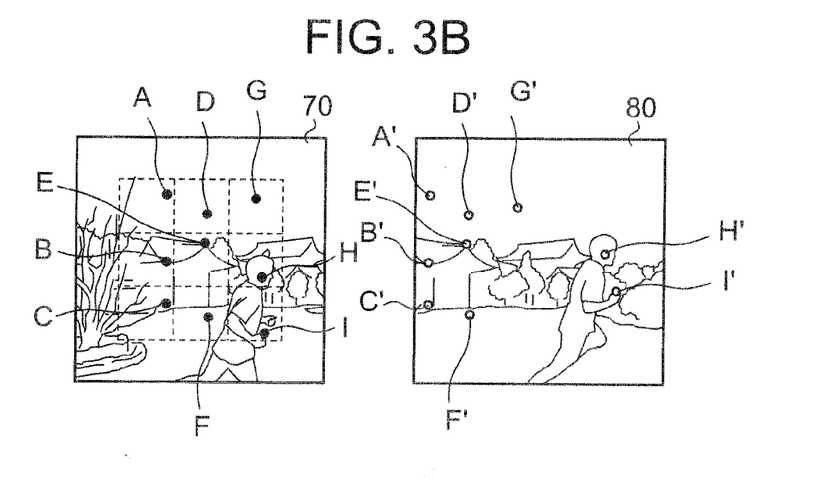
Figure 3C:
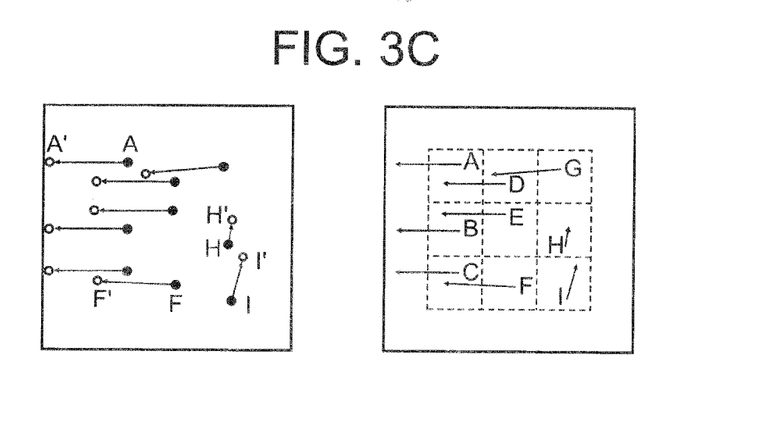
Figure 4A:
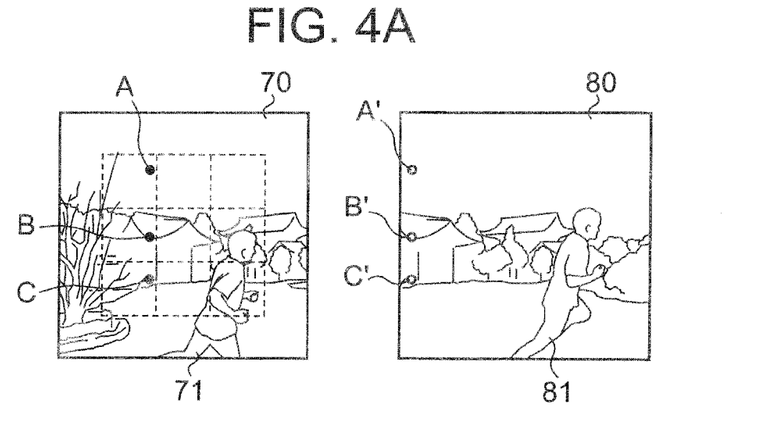
FIGS. 4A, 4B and 4C are diagram for illustrating functions of the adjustment unit and a panoramic image generation unit of an image processing unit.
Figure 4B:
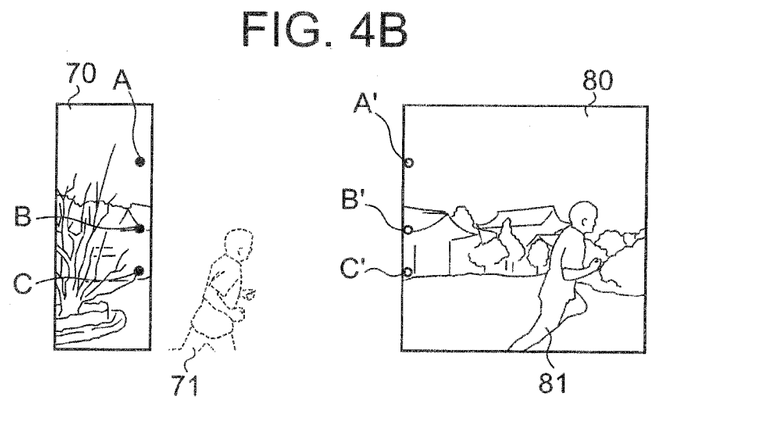
Figure 4C:
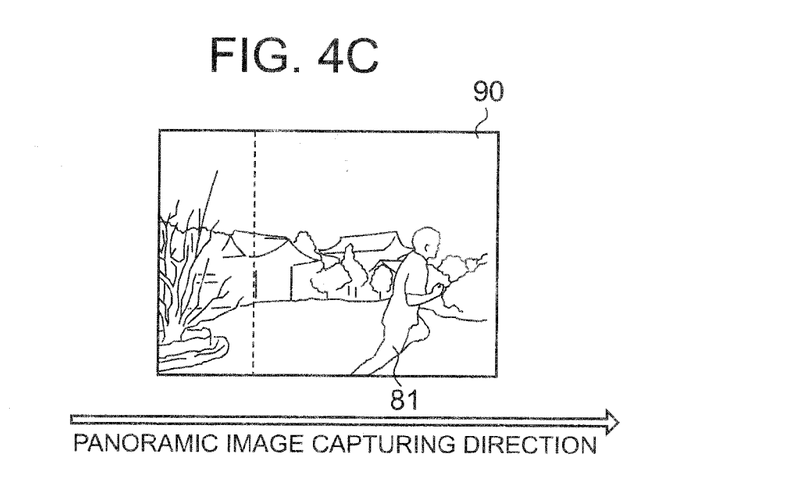

Next, specific descriptions are provided for a function of executing the panoramic image generation processing, with reference to FIGS. 3 and 4.

FIG. 3 is a diagram for illustrating a function of the adjustment unit 55 of the image processing unit 14; and FIG. 4 is a diagram for illustrating functions of the adjustment unit 55 and the panoramic image generation unit 56 of the image processing unit 14. Here, in FIGS. 3 and 4, the panoramic image capturing direction runs from left to right in the drawings.

With reference to FIG. 3A, the image acquisition unit 54 sequentially acquires data of consecutively captured images. In FIG. 3A, data of captured images 70 and 80 are acquired. Here, the captured image 70 is the $n^{th}$ captured image, whose subjects are a moving object 71 showing a person running in a direction from the left to the right in the drawing, and a static field 73 showing background. The captured image 80 is the $n+1^{th}$ captured image, whose subjects are a moving object 81 and a static field 83.

With reference to FIG. 3B, when the image acquisition unit 54 acquires data of captured images, the characteristic point detection unit 551 detects characteristic points in each area of the sequentially acquired captured images, and the characteristic point trace unit 552 identifies corresponding points in adjacent captured images. In FIG. 3B, a plurality of characteristic points including A, B, C, D, E, F, G, H and I are detected in the $n^{th}$ captured image 70, and a plurality of corresponding points A', B', C', D', E', F', G', H' and I', which correspond to the characteristic points A to I, respectively, are detected in the $n+1^{th}$ captured image 80. The characteristic points A to C, the characteristic points D to F, and the characteristic points G to I are each in a group of areas that are adjacent in the direction substantially orthogonal to the panoramic image capturing direction. The characteristic points A to G and the corresponding points A' to G' are detected from the static fields 73 and 83, and the characteristic points H and I and the corresponding point H' and I' are detected from the moving objects 71 and 82.

With reference to FIG. 3C, when the characteristic point trace unit 552 detects the characteristic points and the corresponding points in the adjacent captured images, the characteristic point trace unit 552 calculates vectors from the characteristic points in the $n^{th}$ captured image 70 to the corresponding points in the $n+1^{th}$ captured image 80, respectively. In other words, as shown in FIG. 3C, for example, the characteristic point trace unit 552 calculates a vector from the characteristic point A to the corresponding point A'.

When the characteristic point trace unit 552 calculates the vectors from the characteristic points to the corresponding points in this way, the similarity calculation unit 553 calculates similarity of the vectors in each of a group of areas arranged adjacently along the direction substantially orthogonal to the panoramic image capturing direction. Here, in FIG. 3C, the calculated vectors from the characteristic points A to G to the corresponding point A' to G', respectively, are substantially coincident with the movement of the digital camera in the panoramic image capturing direction; whereas the calculated vectors from the characteristic points H and I to the corresponding points H' and I', respectively, are not coincident with the movement of the digital camera. As a result, based on the similarity calculated by the similarity calculation unit 553, the position adjustment unit 554 can determine that the vectors are similar in a group of areas including the characteristic points A to C and in a group of areas including the characteristic points D to F, and can determine that the vectors are not similar in a group of areas including the characteristic points G to I.

With reference to FIG. 4A, the position adjustment unit 554 adjusts adjacent captured images, based on the result of determining similarity of the vectors.

Here, as shown in FIG. 4B, since the vectors from the characteristic points A to C to the corresponding points A' to C', respectively, are determined to be the most similar, the position adjustment unit 554 adjusts the adjacent captured images at positions of the characteristic points A to C.

In other words, as shown in FIG. 4B, the position adjustment unit 554 adjusts the captured images 70 and 80, such that the characteristic point A coincides with the corresponding point A', the characteristic point B coincides with the corresponding point B', and the characteristic point C coincides with the corresponding point C'. As a result, the captured images 70 and 80 are adjusted at the positions that do not include the moving object 71 that was included in the captured image 70.

With reference to FIG. 4C, when the position adjustment unit 554 adjusts the captured images 70 and 80, the panoramic image generation unit 56 combines data of the captured images 70 and 80 based on a result of the adjustment, and generates data of a combined image 90.

In this way, since the image processing apparatus 1 of the present embodiment adjusts the captured images 70 and 80 by avoiding the moving objects 71 and 81, it is possible to prevent generation of data of a combined image in which a part of the moving objects 71 and 81 is cut, giving an unnatural impression. In other words, as shown in FIG. 4C, it is possible to generate data of the combined image 90 including the moving object 81 just as included in the captured image 80.

Since the image processing apparatus 1 of the present embodiment adjusts adjacent captured images by avoiding moving objects, the moving objects included in the captured images can be displayed in various modes. In other words, it is possible to generate data of a panoramic image that does not include a moving object at all; it is possible to generate data of a panoramic image that includes only a singly moving object; and it is possible to generate data of a panoramic image that shows how the moving object continuously moves.

A moving object can be displayed in such modes by considering a panoramic image capturing direction and the position of the moving object in a captured image, as well as similarity of vectors between corresponding characteristic points. For example, the moving object included in the $n^{th}$ captured image can be removed by adjusting images at a position posterior to the moving object in the panoramic image capturing direction in the $n^{th}$ captured image. The moving object included in the $n^{th}$ captured image can be displayed by adjusting images at a position anterior to the moving object in the panoramic image capturing direction in the $n^{th}$ captured image.

Figure 5:
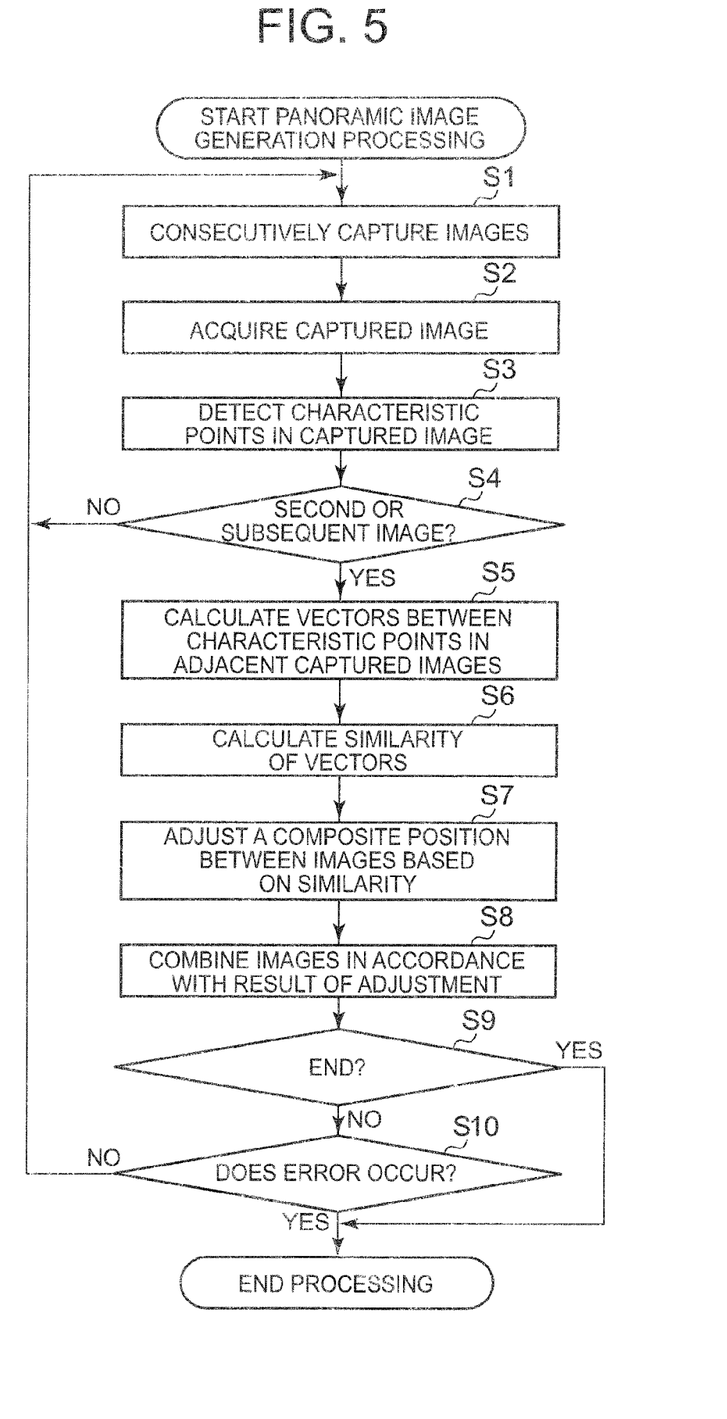
FIG. 5 is flowchart for illustrating a flow of the panorama image generation processing that is executed by the image processing apparatus having the functional configuration shown in FIG. 2.

Next, the panoramic image generation processing is described with reference to FIG. 5. FIG. 5 is flowchart showing a flow of the panorama image generation processing that is executed by the image processing apparatus 1 having the functional configuration shown in FIG. 2.

The panoramic image generation processing is triggered by the user who operates the input unit 18 to initiate the panoramic image generation processing, i.e. by an operation of depressing the shutter button, etc.

In Step S1, the image capturing control unit 51 controls the image capturing unit 17 to consecutively capture images.

In Step S2, each time the image capturing unit 17 captures an image, the image acquisition unit 54 acquires data of the captured image. At this time, the image acquisition unit 54 temporarily stores the data of the captured image thus acquired into the image storage unit 53.

In Step S3, the characteristic point detection unit 551 detects a plurality of characteristic points in the data of the captured image that is acquired in the processing in Step S2, and temporarily stores the characteristic points into the image storage unit 53.

In Step S4, the characteristic point trace unit 552 determines whether the captured image processed in Step S3 is the second or subsequent image. In a case in which the captured image is the second or subsequent image, the determination in Step S4 is YES, and the processing advances to Step S5. In a case in which the captured image is not the second or subsequent image, i.e. the captured image is the first image, the determination in Step S4 is NO, and the processing returns to Step S1.

In Step 55, the characteristic point trace unit 552 calculates vectors between the corresponding characteristic points in the adjacent captured images, by comparing the characteristic points in the adjacent captured images stored in the storage unit 53.

In Step S6, the similarity calculation unit 553 calculates similarity of the vectors between the corresponding characteristic points, which were calculated in the processing in Step S5. More specifically, the similarity calculation unit 553 calculates similarity of the vectors in a group of areas arranged adjacently along the direction orthogonal to the panoramic image capturing direction.

In Step S7, the position adjustment unit 554 adjusts the adjacent captured images, based on the similarity of the vectors calculated in Step S6. For example, the position adjustment unit 554 selects a group of areas in which vectors are the most similar, and adjusts the adjacent images at the positions of the areas.

In Step S8, the panoramic image generation unit 56 combines the data of the captured images adjusted in the processing in Step S7, and generates data of a panoramic image.

In Step S9, the CPU 11 determines whether the panoramic image generation processing should be terminated. For example, in a case in which the digital camera has moved more than a predetermined amount, or in a case in which a predetermined terminating operation by the user is accepted, the CPU 11 determines that the panoramic image generation processing should be terminated. In a case in which the determination in Step S9 is YES, the storage control unit 52 stores the data of the panoramic image generated so far into the image storage unit 53, and the panorama image generation processing is terminated. In a case in which the determination in Step S9 is NO, the processing advances to Step S10.

In Step S10, the CPU 11 or the image processing unit 14 determines whether an error has occurred. For example, in a case in which the digital camera has moved more than a predetermined amount in the direction orthogonal to the panoramic image capturing direction (i.e. in a case in which the camera shake is large), or in a case in which a sufficient number of characteristic points cannot be detected in the captured image, the CPU 11 or the image processing unit 14 determines that an error has occurred. In a case in which the determination in Step S10 is YES, the panoramic image generation processing is terminated; and in a case in which the determination in Step S10 is NO, the processing returns to Step S1.

The image processing apparatus 1 as thus constituted includes: the adjustment unit 55 that adjusts adjacent captured images, as the processing on data of captured images supplied from the image capturing unit 17; and the panoramic image generation unit 56 that generates data of a panoramic image by combining the data of the adjacent captured images, based on a result of adjustment by the adjustment unit 55. Here, the adjustment unit 55 includes: the characteristic point trace unit 552 that calculates vectors between a plurality of corresponding characteristic points in the adjacent captured images; and the position adjustment unit 554 that adjusts the adjacent captured images, based on the vectors between the corresponding characteristic points thus calculated.

As a result, adjacent captured images can be adjusted by avoiding the position of a moving object that moves irrespective of the movement of the digital camera, i.e. by avoiding the position of a characteristic point whose vector is abnormal. As a result, in a panoramic image obtained by combining the data, it is possible to prevent a part of a moving object from being cut, and it is therefore possible to generate data of a panoramic image that does not give an unnatural impression.

By considering the panoramic image capturing direction and a position of a moving object in a captured image, as well as vectors between corresponding characteristic points, the image processing apparatus 1 can display the moving object in various modes in a panoramic image that is obtained by combining the data. In other words, it is possible to generate data of a panoramic image that does not include a moving object at all; it is possible to generate data of a panoramic image that includes only a singly moving object; and it is possible to generate data of a panoramic image that shows how the moving object continuously moves.

Here, in the panoramic image generation processing, the data of the adjacent captured images is typically adjusted along a direction substantially orthogonal to the panoramic image capturing direction. Therefore, in order to identify a position that avoids a moving object, it is preferable to use similarity of vectors that are adjacent in a direction substantially orthogonal to the panoramic image capturing direction. As a result, adjacent captured images can be adjusted linearly along a direction substantially orthogonal to the panoramic image capturing direction, and complicated calculation such as calculation for adjustment along a wave line is not required.

With regard to adjustment based on similarity, images may be adjusted at a position of a group of areas in which vectors are at least similar at a predetermined level, or images may be adjusted at a position of a group of areas in which vectors are the most similar. In a case in which images are adjusted based on predetermined similarity, images can be arbitrarily adjusted in accordance with a position of a moving object in a captured image, and modes of displaying the moving object can be arbitrarily set. In a case in which images are adjusted at a position of a group of areas in which vectors are the most similar, the data of the adjacent captured images can be combined in the most natural manner.

In a digital camera, since edges of a captured image may be generally corrected for distortion of a lens and the like, it is preferable to specify a group of areas near the center excluding the edges of the captured image. As a result, vectors between corresponding characteristic points can be precisely calculated regardless of the distortion of the lens, and data of adjacent captured images can be appropriately combined.

The image processing apparatus 1 according to the present embodiment has been described above, but the present invention is not limited to the aforementioned embodiment, and modifications, improvements, etc. within a scope that can achieve the object of the present invention are also included in the present invention.

In the abovementioned embodiment, in the panoramic image generation processing, adjacent captured images are adjusted or combined each time data of a captured image is acquired. However, images may be adjusted and combined all together after acquiring all the data of captured images for generating data of a panoramic image.

In the aforementioned embodiment, a digital camera has been described as an example of the image processing apparatus 1 to which the present invention is applied, but the present invention is not particularly limited thereto.

For example, the present invention can be applied to electronic devices in general, which have a panoramic image generation function. More specifically, for example, the present invention can be applied to a notebook personal computer, a printer, a television, a video camera, a portable navigation device, a cell phone device, a portable game device, etc.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the aforementioned functions are not particularly limited to the example in FIG. 2, as long as the image processing apparatus 1 includes the functions enabling the aforementioned processing sequence to be executed as its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be configured by the removable medium 31 shown in FIG. 1 distributed separately from the device main body for supplying the program to a user, but can also be configured by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

In the present specification, the steps describing the program recorded in the storage medium include not only the processing executed in a time series following this order, but also processing executed in parallel or individually, which is not necessarily executed in a time series.

In the present specification, terminologies describing a system refer to a whole apparatus configured with a plurality of devices, a plurality of means and the like.

Although some embodiments of the present invention have been described above, the embodiments are merely examples, and do not limit the technical scope of the present invention. Other various embodiments can be employed for the present invention, and various modifications such as omission and replacement are possible without departing from the spirit of the present invention. Such embodiments and modifications are included in the scope of the invention and the summary described in the present specification, and are included in the invention recited in the claims as well as the equivalent scope thereof.

What is claimed is:

1. An image processing apparatus, comprising:
an acquisition unit that acquires a first image and a second image consecutively captured by an image capturing unit, while the image capturing unit is moved;
a division unit that divides the first image acquired by the acquisition unit into a plurality of areas;
a characteristic point detection unit that detects first characteristic points in the areas of the first image, respectively, and second characteristic points in the second image, the second characteristic points corresponding to the first characteristic points, respectively;
a vector calculation unit that calculates vectors between the first characteristic points and the corresponding second characteristic points;
an area selection unit that selects a particular area having no moving object from among the areas, based on the vectors calculated by the vector calculation unit; and
a combining unit that combines the images, based on the particular area having no moving object selected by the area selection unit,
wherein the division unit divides a region of the first image into the plurality of areas, the region having a size based on particular information.

2. The image processing apparatus according to claim 1, further comprising:
a similarity calculation unit that calculates similarity of the vectors calculated for each group of areas among the areas, said each group of areas being arranged adjacently along a direction substantially orthogonal to a direction of the moving of the image capturing unit,
wherein the area selection unit selects the group of areas as particular areas having no moving object from among each group of areas, based on the similarity calculated by the similarity calculation unit.

3. The image processing apparatus according to claim 2, wherein the similarity calculation unit calculates similarity of the vectors for each group of areas in a central portion of the image.

4. The image processing apparatus according to claim 2, wherein the area selection unit selects the group of the areas whose vectors are the most similar from each group of the areas, for adjusting a composite position between the images.

5. An image processing method, comprising:
acquiring a first image and a second image consecutively captured by an image capturing unit, while the image capturing unit is moved;
dividing the first image acquired in the acquiring into a plurality of areas;
detecting first characteristic points in the areas of the first image, respectively, and second characteristic points in the second image, the second characteristic points corresponding to the first characteristic points, respectively;
calculating vectors between the first characteristic points and the corresponding second characteristic points;
selecting a particular area having no moving object from among the areas, based on the calculated vectors; and combining the images, based on the selected particular area having no moving object,
wherein, in the dividing, a region of the first image is divided into the plurality of areas, the region having a size based on particular information.

6. A non-transitory storage medium having stored thereon a computer readable program, the program causing a computer to function as:
an acquisition unit that acquires a first image and a second image consecutively captured by an image capturing unit, while the image capturing unit is moved;
a division unit that divides the first image acquired by the acquisition unit into a plurality of areas;
a characteristic point detection unit that detects first characteristic points in the areas of the first image, respectively, and second characteristic points in the second image, the second characteristic points corresponding to the first characteristic points respectively;
a vector calculation unit that calculates vectors between the first characteristic points and the corresponding second characteristic points;
an area selection unit that selects a particular area having no moving object from among the areas, based on the vectors calculated by the vector calculation unit; and
a combining unit that combines the images, based on the particular area having no moving object selected by the area selection unit,
wherein the division unit divides a region of the first image into the plurality of areas, the region having a size based on particular information.

7. The information according to claim 1, wherein the particular information is information relating to lens performance.

8. The information according to claim 1, wherein the particular information is information of a movement distance between adjacent captured images.

9. The region according to claim 1, wherein the region is a region near a center of the first image, other than the edges of the first image.

* * * * *